United States Patent
Lee et al.

(10) Patent No.: US 9,577,837 B2
(45) Date of Patent: Feb. 21, 2017

(54) METHOD AND APPARATUS FOR DISCOVERING COMMUNICATION ENTITY

(71) Applicant: Electronics and Telecommunications Research Institute, Daejeon (KR)

(72) Inventors: Soo-Hyung Lee, Daejeon (KR); Hyung-Kook Jun, Seoul (KR); Kyung-Il Kim, Daejeon (KR); Kyeong-Tae Kim, Daejeon (KR); Je-Man Park, Seoul (KR); Yong-Yeon Kim, Daejeon (KR); Won-Tae Kim, Asan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 449 days.

(21) Appl. No.: 14/293,580

(22) Filed: Jun. 2, 2014

(65) Prior Publication Data

US 2014/0365589 A1 Dec. 11, 2014

(30) Foreign Application Priority Data

Jun. 5, 2013 (KR) .......................... 10-2013-0064402

(51) Int. Cl.
*H04L 12/18* (2006.01)
(52) U.S. Cl.
CPC ....... *H04L 12/1854* (2013.01); *H04L 12/1881* (2013.01)
(58) Field of Classification Search
None
See application file for complete search history.

(56) References Cited

U.S. PATENT DOCUMENTS

| | | | |
|---|---|---|---|
| 2007/0150570 A1 | 6/2007 | Eastham | |
| 2009/0010179 A1* | 1/2009 | Laroia | H04W 8/005 370/254 |

(Continued)

FOREIGN PATENT DOCUMENTS

KR 10-2008-0001144 A 1/2008

OTHER PUBLICATIONS

Chakraborty, Dipanjan, et al. "Toward distributed service discovery in pervasive computing environments." Mobile Computing, IEEE Transactions on 5.2 (2006): 97-112.

*Primary Examiner* — Natisha Cox
(74) *Attorney, Agent, or Firm* — NSIP Law

(57) ABSTRACT

Disclosed herein are an apparatus and method for discovering a communication entity. The apparatus for discovering a communication entity includes a list generation unit for generating a list of connection target Data Readers (DRs), a counter generation unit for generating a counter including information about a number of the connection target DRs, and a discovery message communication unit for establishing communication connections to the connection target DRs based on the list and the counter. The discovery message communication unit includes a transmission unit for transmitting a DR discovery message including data topic information or possible service quality information to each of the connection target DRs, and a reception unit for receiving a Data Writer (DW) discovery message including data topic information or possible service quality information from each of the connection target DRs.

20 Claims, 6 Drawing Sheets

(56) References Cited

U.S. PATENT DOCUMENTS

| | | | |
|---|---|---|---|
| 2012/0203919 A1* | 8/2012 | Lee | H04L 63/083 709/229 |
| 2012/0239759 A1* | 9/2012 | Sun | H04W 8/005 709/206 |
| 2013/0157656 A1* | 6/2013 | Gao | H04W 76/023 455/434 |
| 2014/0219261 A1* | 8/2014 | Johnsson | H04W 76/023 370/338 |

* cited by examiner

METHOD AND APPARATUS FOR DISCOVERING COMMUNICATION ENTITY

CROSS REFERENCE TO RELATED APPLICATION

This application claims the benefit of Korean Patent Application No. 10-2013-0064402 filed on Jun. 5, 2013, which is hereby incorporated by reference in its entirety into this application.

BACKGROUND

1. Field

The present invention relates generally to a method and apparatus for discovering a communication entity and, more particularly, to a method and apparatus for discovering a communication entity, which can provide efficient and reliable communication between communication nodes requiring interaction in a complex system composed of large-scale physical nodes.

2. Description of Related Art

When communication entities that are targets to be connected are directly recognized and connection information thereof is managed upon establishing a communication connection, a communication connection needs only to be directly established based on connection information if interaction is required. However, as the number of communication entities constituting the entire application domain has rapidly increased, the number of data types to be exchanged and the number of services to be provided has also rapidly increased. Accordingly, it is difficult for individual nodes to manage such data types and services on the whole, and pieces of data and a number of services provided/requested for respective nodes may vary depending on the states of the nodes, thus making it realistically impossible for each node to previously set/manage information about counterpart communication entities to which the corresponding node is to be connected. In order to perform such a function, communication middleware has appeared, and Data Distribution Service (DDS) technology standardized by Object Management Group (OMG) has been widely used based on the field of national defense. Further, in Korean Patent Application Publication No. 2008-0001144 or the like, a method of recognizing a communication entity which will request/provide the corresponding data or service at the time at which data or service is actually required and searching for connection information about the corresponding entity has been introduced. Since a method of discovering a communication entity must find connection information about a target entity in a state in which the target entity is not recognized, two types of methods are chiefly used. One is a method of requesting information related to a communication connection from unspecified communication entities constituting the entire application domain and receiving a response to the request in a multicasting/broadcasting manner. The other is a method of providing a server at the center of the domain, registering data or service information to be provided/requested by the corresponding node itself on the server, searching for the data or service information, and acquiring connection information about a counterpart communication entity have been chiefly used. As in the case of the latter, when the server is placed at the center, there is a disadvantage in that when the server is not desirably operated, it is difficult to execute the entire application. In the case of the former, distributed processing is possible, so that, even if a specific node is malfunctioning, there is little influence exerted on the entire application, but there is a disadvantage in that, when a network to connect communication entities constituting the entire application domain does not support broadcasting or multicasting, it is difficult to apply the former method.

SUMMARY

Accordingly, the present invention has been made keeping in mind the above problems occurring in the prior art, and an object of the present invention is to predefine information about communication entities to which connections are to be made and thus to reduce the number of messages and the size of related loads required for discovery as discovery is performed for the predefined communication entities.

Another object of the present invention is to predefine information about time interval variable values and information about the number of communication entities to which a current node is to be connected, for respective nodes, thus preventing messages from colliding with each other in each node.

A further object of the present invention is to utilize a discovery technique, provided by a Data Distribution Service (DDS), under a specific condition, thus enabling a communication entity that belatedly joins a network to be discovered.

In accordance with an aspect of the present invention to accomplish the above objects, there is provided a method for discovering a communication entity, including generating a list of connection target Data Readers (DRs); generating a counter including information about a number of the connection target DRs; and establishing communication connections to the connection target DRs based on the list and the counter, wherein establishing the communication connections comprises transmitting a DR discovery message including data topic information or possible service quality information to each of the connection target DRs, and receiving a Data Writer (DW) discovery message including data topic information or possible service quality information from each of the connection target DRs.

Preferably, the method may further include generating time information including information about a transmission time interval required to prevent individual DR discovery messages from colliding with each other and a waiting time required to receive the DW discovery message, wherein transmitting is performed based on the list, the counter, and the time information.

Preferably, the method may further include, after establishing the communication connections, determining, based on the counter, whether connections to a number of connection target DRs corresponding to the number of connection target DRs, included in the counter, have been completed.

Preferably, determining may further include, if the connections have not been completed even after the waiting time, transmitting a Domain Participant (DP) discovery message required to discover a DP that is a container object for managing communication entities using a one-to-many communication method.

Preferably, transmitting the DR discovery message may be performed at each transmission time interval until the DR discovery message is transmitted to a last connection target DR in the list.

Preferably, if the DR discovery message has been transmitted to a last connection target DR in the list, a current state may be changed to a waiting state for receiving a DW discovery message from a DR that is not present in the list.

Preferably, when the current state is changed to the waiting state, a communication connection to the DR may be established by transmitting a DR discovery message to the DR after the DW discovery message has been received.

Preferably, transmitting the DP discovery message may be performed at each preset transmission time interval.

Preferably, establishing may be configured to, if information included in the DR discovery message is information corresponding to a topic and a service quality of a corresponding connection target DR, receive a DW discovery message from the connection target DR.

Preferably, if the DR discovery message is transmitted as a response to the DW discovery message, a current state may be changed to a waiting state for receiving a DW discovery message from a DR that is not present in the list.

In accordance with another aspect of the present invention to accomplish the above objects, there is provided an apparatus for discovering a communication entity, including a list generation unit for generating a list of connection target Data Readers (DRs); a counter generation unit for generating a counter including information about a number of the connection target DRs; and a discovery message communication unit for establishing communication connections to the connection target DRs based on the list and the counter, wherein the discovery message communication unit comprises a transmission unit for transmitting a DR discovery message including data topic information or possible service quality information to each of the connection target DRs, and a reception unit for receiving a Data Writer (DW) discovery message including data topic information or possible service quality information from each of the connection target DRs.

Preferably, the apparatus may further include a time information generation unit for generating time information including information about a transmission time interval required to prevent individual DR discovery messages from colliding with each other and a waiting time required to receive the DW discovery message, wherein the discovery message communication unit establishes the communication connections to the connection target DRs based on the list, the counter, and the time information.

Preferably, the discovery message communication unit may further include a determination unit for determining, based on the counter, whether connections to a number of connection target DRs corresponding to the number of connection target DRs, included in the counter, have been completed.

Preferably, the transmission unit may be configured to, if it is determined that the connections have not been completed even after the waiting time, transmit a Domain Participant (DP) discovery message required to discover a DP that is a container object for managing communication entities using a one-to-many communication method.

Preferably, the transmission unit may transmit the DR discovery message at each transmission time interval until the DR discovery message is transmitted to a last connection target DR in the list.

Preferably, the discovery message communication unit may be configured to, if the DR discovery message has been transmitted to a last connection target DR in the list, change a current state to a waiting state for receiving a DW discovery message from a DR that is not present in the list.

Preferably, the discovery message communication unit may be configured to, when the current state is changed to the waiting state, establish a communication connection to the DR by transmitting a DR discovery message to the DR after the DW discovery message has been received from the DR.

Preferably, the transmission unit may transmit the DP discovery message at each preset transmission time interval.

Preferably, the reception unit may be configured to, if information included in the DR discovery message is information corresponding to a topic and a service quality of a corresponding connection target DR, receive a DW discovery message from the connection target DR.

Preferably, the discovery message communication unit may be configured to, if the DR discovery message is transmitted as a response to the DW discovery message, change a current state to a waiting state for receiving a DW discovery message from a DR that is not present in the list.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
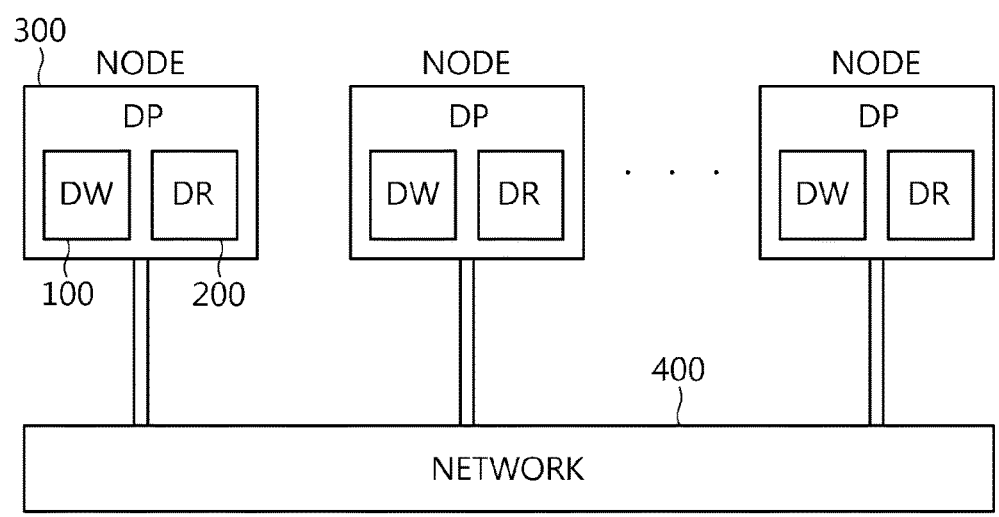
FIG. 1 is a diagram showing the basic structure of Data Distribution Service (DDS) middleware.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, the basic structure of Data Distribution Service (DDS) middleware and a conceptual procedure for discovering a communication entity will be described. FIG. 1 is a diagram showing the basic structure of DDS middleware, and FIG. 2 is a diagram showing a conceptual procedure in which the DDS middleware discovers a communication entity.

Figure 2:
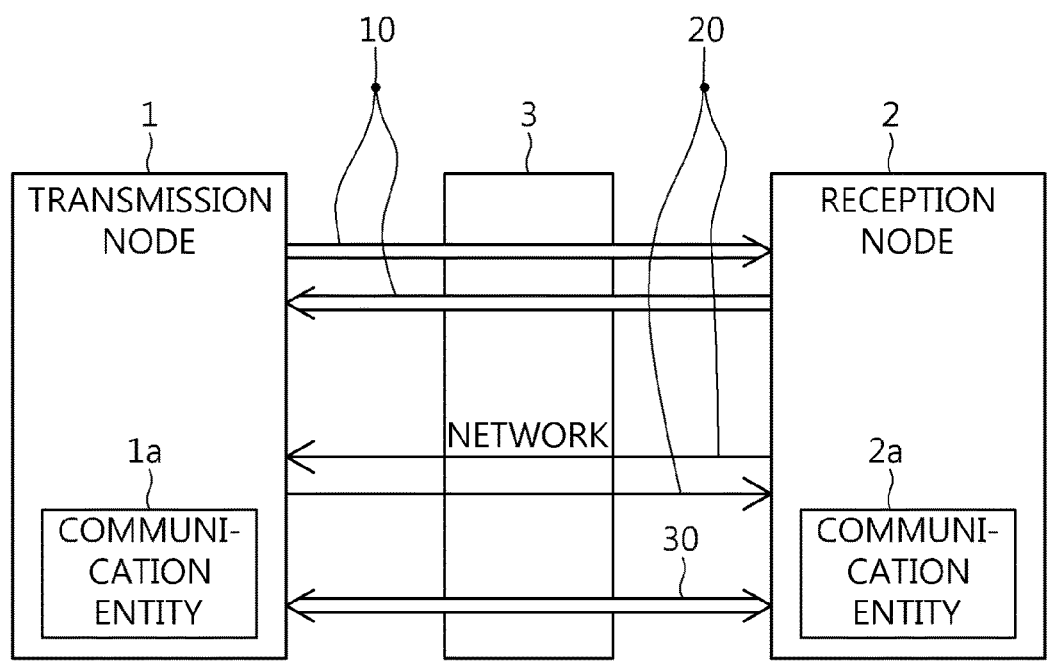
FIG. 2 is a diagram showing a conceptual procedure in which the DDS middleware discovers a communication entity.

Referring to FIGS. 1 and 2, DDS middleware includes a Data Writer (DW) 100 for transmitting data and a Data Reader (DR) 200 for receiving data as communication entities 1*a* and 2*a* which will actually exchange data for each data topic defined by an application. As a container entity for managing the communication entities, a Domain Participant (DP) 300 is present. Unless an additional application using DDS is present in the corresponding node, a single DP 300 is present per node. The structure of a network in which DDS is operated basically premises the environment of a single network 400 in which transmission media are shared. Therefore, discovery for communication in DDS is divided into a primary stage in which DPs present in respective nodes are mutually found, and a secondary stage in which a communication entity taking charge of transmission of data topics desired to be exchanged by the corresponding node is discovered for each found DP. Since a DP does not recognize which nodes are present in the network, a data transmission node 1 or reception node 2 notifies the network of the presence of DP using a group communication method 10 such as multicasting or broadcasting if its own DP is generated, thus completing the discovery of other DPs present in a DDS domain. Thereafter, each node performs secondary discovery using a unicasting method 20 to determine whether a communication entity 1*a* or 2*a* related to its own data topic is present in the discovered remaining DPs. In the secondary discovery stage, when a counterpart node has a communication entity related to a current node's data topic, the communication entity of the current node establishes a communication connection to the communication entity, and data exchange 30 is performed between the two communication entities.

When the above method defined in DDS is used, a primary discovery stage is configured such that, if the number of nodes exceeds a predetermined number, and individual nodes simultaneously transmit discovery messages using a multicasting or broadcasting method as in the case of a complex system in which nodes are closely coupled to each other, a network environment in which transmission media are shared causes an overload on a network and then makes it impossible to exchange the discovery messages. Further, the secondary discovery stage is disadvantageous in that, after nodes have been discovered, communication entities related to a data topic required by the current node are discovered in all of the discovered nodes, and thus the number of messages and the size of related loads required for discovery are increased. In order to solve this disadvantage, the present invention presents a scheme for predefining information about communication entities to which connections are to be made and basically performing mutual discovery based on the predefined information. Further, in order to prevent messages from colliding with each other in each node, information about time interval variable values and information about the number of communication entities to which a current node is to be connected are maintained and utilized for respective nodes. Furthermore, a discovery technique provided by DDS is utilized some conditions, and thus communication entities belatedly joining a network may also be discovered.

Figure 3:
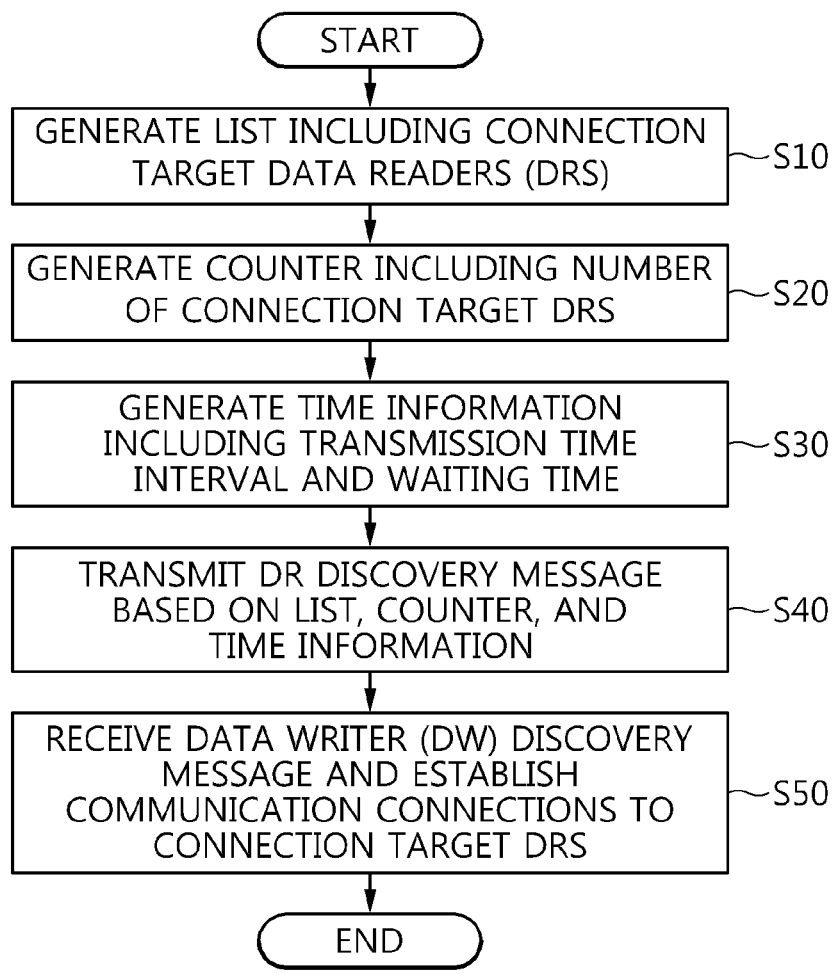
FIGS. 3 and 4 are flowcharts showing a method for discovering a communication entity according to the present invention.
Figure 4:
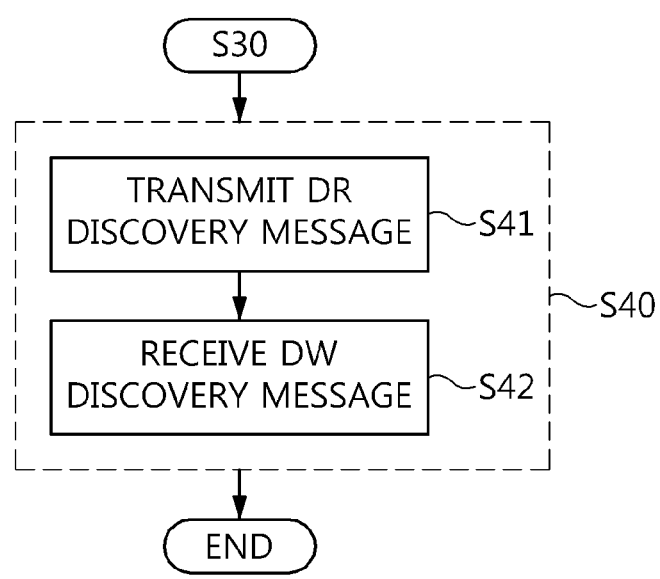

Hereinafter, a method of discovering a communication entity according to the present invention will be described in detail. FIGS. 3 and 4 are flowcharts showing a communication entity discovery method according to the present invention.

Referring to FIGS. 3 and 4, the communication entity discovery method according to the present invention includes the step S10 of generating a list of connection target Data Readers (DRs), the step S20 of generating a counter including information about the number of connection target DRs, the step S30 of generating time information including a transmission time interval and a waiting time, and the step S40 of establishing communication connections to the connection target DRs based on the list, the counter, and the time information.

In this case, the step S40 of establishing communication connections to the connection target DRs includes the step S41 of transmitting a DR discovery message including data topic information or possible service quality information to the connection target DRs, and the step S42 of receiving a Data Writer (DW) discovery message including data topic information or possible service quality information from the connection target DRs.

At the step S10 of generating the list of connection target DRs, the list includes information about other communication entities to which a current node itself must establish connections. At the step S20 of generating the counter including information about the number of connection target DRs, the counter includes information about the total number of communication entities to which the current node is to be connected. At the step S30 of generating the time information including the transmission time interval and the waiting time, the time information denotes information required to determine a time interval and a basic waiting time which are to be applied between discovery messages when multiple discovery messages are transmitted by each node, wherein such time information may be defined as different values for respective nodes. Each node sets such a time interval value to a maximum value, selects a random value within this time interval for each message, and transmits a message so that a time difference with a previous message is maintained by the random value. This results in an advantage in that the occurrence of a collision between messages is minimized when multiple nodes simultaneously transmit discovery messages for respective nodes. The step of establishing communication connections to communication target DRs based on the list, the counter, and the time information will be described in detail later.

Figure 5:
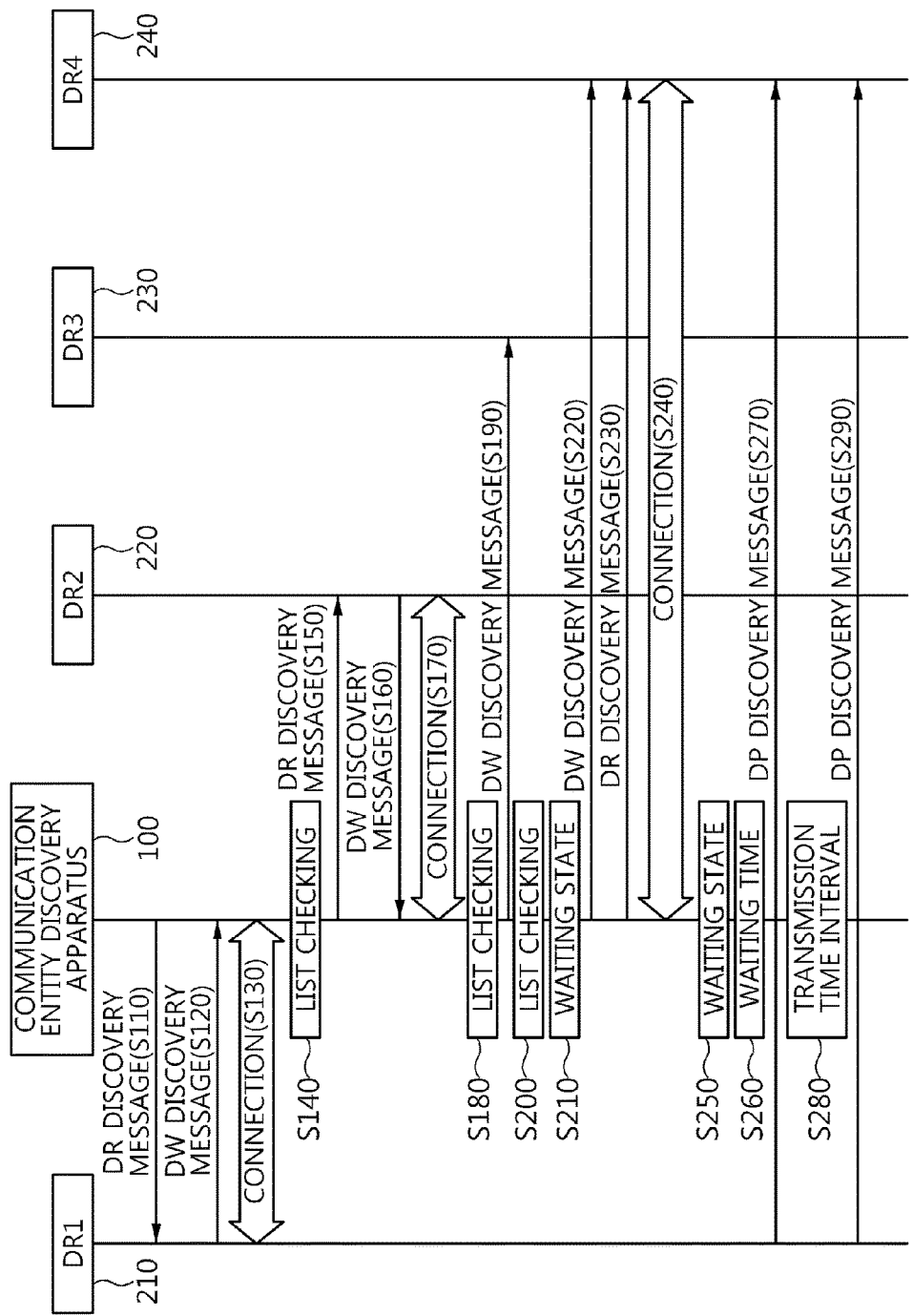
FIG. 5 is a diagram showing an embodiment of a communication entity discovery method according to the present invention.

Hereinafter, embodiments of a method and apparatus for discovering a communication entity according to the present invention will be described in detail. FIG. 5 is a diagram showing an embodiment of a method for discovering a communication entity according to the present invention.

Referring to FIG. 5, a communication entity discovery apparatus 100 according to the present invention, and DR1 210, DR2 220, DR3 230, and DR4 240, as Data Readers (DRs) to which the communication entity discovery apparatus is to be connected, are present. In this case, it is premised that the DR1 210, DR2 220, and DR3 230 are stored as connection target DRs in the list of the communication entity discovery apparatus 100. Further, it is premised that the total number of DRs to which the apparatus is to be connected is defined as four in the counter of the communication entity discovery apparatus 100.

The communication entity discovery apparatus 100 checks information about the characteristics of and the total number of DRs to which it is to be connected, based on the list and counter thereof. Thereafter, the communication entity discovery apparatus 100 transmits a DR discovery message including data topic information or possible service quality information to the DR1 210 corresponding to a connection target DR at step S110. In this case, the DR1 210 being in a waiting state receives the DR discovery message, and determines whether the topic information of the DR discovery message is identical to its own data topic, or whether the service quality of the DR discovery message satisfies its own desired service quality. As a result of the determination, if the above requirement has been fulfilled, the DR1 210 transmits a Data Writer (DW) discovery message including its own data topic information or possible service quality information to the communication entity discovery apparatus 100 at step S120. By means of mutual transmission at steps S110 and S120, the DR1 210 and the communication entity discovery apparatus 100 are connected at step S130.

In this case, the communication entity discovery apparatus 100 checks its own list at step S140, and determines whether a DR discovery message has been transmitted to the last connection target DR in the list. In this case, if it is determined that the DR discovery message has not been transmitted to the last connection target, the communication entity discovery apparatus 100 transmits a DR discovery message to the DR2 220 corresponding to a next DR in the list at step S150. In this case, the DR2 220 being in a waiting state receives the DR discovery message, and determines whether the data topic information of the DR discovery message is identical to its own data topic or whether the service quality of the DR discovery message satisfies its own desired service quality. If it is determined that the requirement has been fulfilled, the DR2 220 transmits a DW discovery message including its own data topic information or possible service quality information to the communication entity discovery apparatus 100 at step S160. By means of mutual transmission at steps S150 and S160, the DR2 220 and the communication entity discovery apparatus 100 are connected at step S170.

Thereafter, the communication entity discovery apparatus 100 checks its list at step S180, and determines whether a DR discovery message has been transmitted to the last connection target DR in the list. Here, if it is determined that the DR discovery message has not been transmitted to the last connection target, the communication entity discovery apparatus 100 transmits a DR discovery message to the DR3 230 corresponding to a next DR in the list at step S190. The DR discovery messages transmitted to the DR1 210, DR2 220, and DR3 230 are configured to be sent at preset transmission time intervals based on predefined time information. The communication entity discovery apparatus checks the list again at step S200, and then determines that the DR discovery message has been transmitted to the DR3 230 corresponding to the last connection target. In this case, the communication entity discovery apparatus changes its state to a waiting state so as to receive a DW discovery message from the DR4 240 which is not present in the list. If the communication entity discovery apparatus changes its state to the waiting state, the communication entity discovery apparatus receives a DW discovery message from the DR4 240 at step S220. Thereafter, the communication entity discovery apparatus transmits a DR discovery message to the DR4 240 at step S230, and thus establishes a communication connection to the DR4 240. That is, the communication entity discovery apparatus receives the DW discovery message from the DR4 before transmitting the DR discovery message, and transmits the DR discovery message as a response to the DW discovery message, thus making a communication connection. Further, when the DR discovery message from the communication entity discovery apparatus has been transmitted as a response to the DW discovery message, the communication entity discovery apparatus changes its state to a waiting state so as to receive a DW discovery message from a DR which is not present in the list at step S250. In this regard, the waiting state is not continuously maintained. That is, if connections to a number of DRs corresponding to the total number of DRs to be connected, which is stored in the counter, have not been completed even if the communication entity discovery apparatus is waiting for the preset waiting time (S260), based on the waiting time (S260) stored in the time information, the communication entity discovery apparatus transmits a Domain Participant (DP) discovery message required to discover a DP which is a container object for managing communication entities using a one-to-many communication method at step S270.

Continuing with FIG. 5, it is premised in the counter that the communication entity discovery apparatus is to be connected to four DRs, but only three DRs, that is, DR1 210, DR2 220, and DR4 240, are currently connected to the apparatus. Here, the term "one-to-many communication" denotes a group communication method such as multicasting or broadcasting. In this case, the DP discovery message is transmitted at each transmission time interval (S280) based on the transmission time interval included in the time information. Therefore, if the transmission time interval (S280) has elapsed after the performance of step S270, a DP discovery message is retransmitted at step S290.

Figure 6:
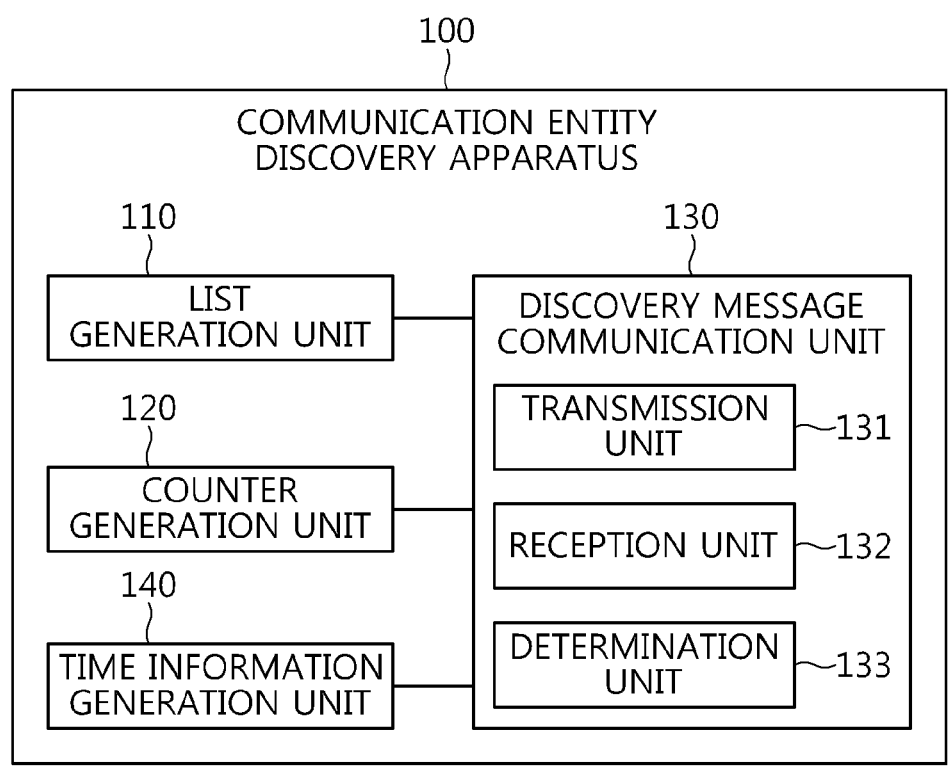
FIG. 6 is a block diagram showing an apparatus for discovering a communication entity according to the present invention.

Hereinafter, the configuration and operation of the communication entity discovery apparatus according to the present invention will be described in detail. FIG. 6 is a block diagram showing a communication entity discovery apparatus according to the present invention.

Referring to FIG. 6, the communication entity discovery apparatus 100 according to the present invention includes a list generation unit 110, a counter generation unit 120, a time information generation unit 140, and a discovery message communication unit 130. The list generation unit 110 generates a list of connection target DRs. The counter generation unit 120 generates a counter including information about the number of connection target DRs. The time information generation unit 140 generates time information including information about a transmission time interval required to prevent discovery messages from colliding with each other and a waiting time required to receive DW discovery messages. The discovery message communication unit 130 establishes communication connections to the connection target DRs based on the list, the counter, and the time information. In this case, the discovery message communication unit 130 includes a transmission unit 131 for transmitting a DR discovery message including data topic information or possible service quality information to the connection target DRs, and a reception unit 132 for receiving a DW discovery message including data topic information or possible service quality information from the connection target DRs.

Further, the discovery message communication unit 130 may further include a determination unit 133 for determining whether connections to a number of connection target DRs corresponding to the number of connection target DRs, stored in the counter, have been completed.

The list generated by the list generation unit 110 includes information about other communication entities to which the apparatus must establish connections. The counter generated by the counter generation unit 120 includes information about the total number of communication entities to which the apparatus is to be connected. The time information generated by the time information generation unit 140 denotes information required to determine a time interval and a basic waiting time to be applied between discovery messages when each node transmits a plurality of discovery messages, and such information may be defined as different values for respective nodes. Each node sets such a time interval value to a maximum value, selects a random value within this time interval for each message, and transmits a message so that a time difference with a previous message is maintained by the random value. This results in an advantage in that the occurrence of a collision between messages is minimized when multiple nodes simultaneously transmit discovery messages for respective nodes.

The communication entity discovery apparatus 100 checks information about the characteristics of and the total number of DRs to which it is to be connected, based on its list and counter. Thereafter, the communication entity discovery apparatus 100 transmits a DR discovery message including data topic information or possible service quality information to the DR1 corresponding to a connection target DR. In this case, the DR1 being in a waiting state receives the DR discovery message, and determines whether the topic information of the DR discovery message is identical to its own data topic, or whether the service quality of the DR discovery message satisfies its own desired service quality. As a result of the determination, if the above requirement has been fulfilled, the DR1 transmits a Data Writer (DW) discovery message including its own data topic information or possible service quality information to the communication entity discovery apparatus 100. Therefore, the DR1 and the communication entity discovery apparatus 100 are connected.

In this case, the communication entity discovery apparatus 100 checks its own list, and determines whether a DR discovery message has been transmitted to the last connection target DR in the list. In this case, if it is determined that the DR discovery message has not been transmitted to the last connection target, the communication entity discovery apparatus 100 transmits a DR discovery message to the DR2 corresponding to a next DR in the list. In this case, the DR2 being in a waiting state receives the DR discovery message, and determines whether the data topic information of the DR discovery message is identical to its own data topic or whether the service quality of the DR discovery message satisfies its own desired service quality. If it is determined that the requirement has been fulfilled, the DR2 transmits a DW discovery message including its own data topic information or possible service quality information to the communication entity discovery apparatus 100. Therefore, the DR2 and the communication entity discovery apparatus 100 are connected.

The communication entity discovery apparatus 100 checks its list, and determines whether a DR discovery message has been transmitted to the last connection target DR in the list. Here, if it is determined that the DR discovery message has not been transmitted to the last connection target, the communication entity discovery apparatus 100 transmits a DR discovery message to a DR corresponding to a next DR in the list. In this case, the DR discovery message is transmitted at each preset transmission time interval based on predefined time information. The communication entity discovery apparatus 100 checks the list again. If it is determined that the DR discovery message has been transmitted to a DR corresponding to the last connection target, the communication entity discovery apparatus 100 changes its state to a waiting state so as to receive a DW discovery message from a non-present DR which is not present in the list. If the communication entity discovery apparatus changes its state to the waiting state, the communication entity discovery apparatus receives a DW discovery message from the non-present DR, transmits a DR discovery message to the non-present DR, and then establishes a communication connection to the non-present DR. That is, the communication entity discovery apparatus receives the DW discovery message from the non-present DR before transmitting the DR discovery message, and transmits the DR discovery message as a response to the DW discovery message, thus making a communication connection. Further, even when the DR discovery message from the communication entity discovery apparatus has been transmitted as a response to the DW discovery message, the communication entity discovery apparatus changes its state to a waiting state so as to receive a DW discovery message from a non-present DR which is not present in the list. In this regard, the waiting state is not continuously maintained. That is, if connections to a number of DRs corresponding to the total number of DRs to be connected, which is stored in the counter, have not been completed even if the communication entity discovery apparatus is waiting for the preset waiting time, based on the waiting time stored in the time information, the communication entity discovery apparatus transmits a Domain Participant (DP) discovery message required to discover a DP which is a container object for managing communication entities using a one-to-many communication method. Here, the term "one-to-many communication" denotes a group communication method such as multicasting or broadcasting. In this case, the DP discovery message is transmitted at each transmission time interval based on the transmission time interval included in the time information.

In accordance with the present invention, information about communication entities to which connections are to be made is predefined, thus reducing the number of messages and the size of related loads required for discovery as discovery is performed for the predefined communication entities.

Further, in accordance with the present invention, information about time interval variable values and information about the number of communication entities to which a current node is to be connected are predefined for respective nodes, thus preventing messages from colliding with each other in each node.

Furthermore, in accordance with the present invention, a discovery technique, provided by a Data Distribution Service (DDS), is utilized under a specific condition, thus enabling a communication entity that belatedly joins a network to be discovered.

As described above, in the apparatus and method for discovering a communication entity according to the present invention, the configurations and schemes in the above-described embodiments are not limitedly applied, and some or all of the above embodiments can be selectively combined and configured so that various modifications are possible.

What is claimed is:

1. A method for discovering a communication entity, comprising:
    generating a list of connection target Data Readers (DRs);
    generating a counter including information about a number of the connection target DRs; and
    establishing communication connections to the connection target DRs based on the list and the counter,
    wherein establishing the communication connections comprises:
    transmitting a DR discovery message including data topic information or possible service quality information to each of the connection target DRs, and
    receiving a Data Writer (DW) discovery message including data topic information or possible service quality information from each of the connection target DRs.

2. The method of claim 1, further comprising generating time information including information about a transmission time interval required to prevent individual DR discovery messages from colliding with each other and a waiting time required to receive the DW discovery message,
    wherein transmitting is performed based on the list, the counter, and the time information.

3. The method of claim 2, further comprising, after establishing the communication connections, determining, based on the counter, whether connections to a number of connection target DRs corresponding to the number of connection target DRs, included in the counter, have been completed.

4. The method of claim 3, wherein determining further comprises, if the connections have not been completed even after the waiting time, transmitting a Domain Participant (DP) discovery message required to discover a DP that is a container object for managing communication entities using a one-to-many communication method.

5. The method of claim 2, wherein transmitting the DR discovery message is performed at each transmission time interval until the DR discovery message is transmitted to a last connection target DR in the list.

6. The method of claim 2, wherein if the DR discovery message has been transmitted to a last connection target DR in the list, a current state is changed to a waiting state for receiving a DW discovery message from a DR that is not present in the list.

7. The method of claim 6, wherein, when the current state is changed to the waiting state, a communication connection to the DR is established by transmitting a DR discovery message to the DR after the DW discovery message has been received.

8. The method of claim 4, wherein transmitting the DP discovery message is performed at each preset transmission time interval.

9. The method of claim 1, wherein establishing is configured to, if information included in the DR discovery message is information corresponding to a topic and a service quality of a corresponding connection target DR, receive a DW discovery message from the connection target DR.

10. The method of claim 1, wherein if the DR discovery message is transmitted as a response to the DW discovery message, a current state is changed to a waiting state for receiving a DW discovery message from a DR that is not present in the list.

11. An apparatus for discovering a communication entity, comprising:
 a list generation unit configured to generate a list of connection target Data Readers (DRs);
 a counter generation unit configured to generate a counter including information about a number of the connection target DRs; and
 a discovery message communication unit configured to establish communication connections to the connection target DRs based on the list and the counter,
 wherein the discovery message communication unit comprises:
 a transmission unit configured to transmit a DR discovery message including data topic information or possible service quality information to each of the connection target DRs, and
 a reception unit configured to receive a Data Writer (DW) discovery message including data topic information or possible service quality information from each of the connection target DRs.

12. The apparatus of claim 11, further comprising a time information generation unit configured to generate time information including information about a transmission time interval required to prevent individual DR discovery messages from colliding with each other and a waiting time required to receive the DW discovery message,
 wherein the discovery message communication unit establishes the communication connections to the connection target DRs based on the list, the counter, and the time information.

13. The apparatus of claim 12, wherein the discovery message communication unit further comprises a determination unit configured to determine, based on the counter, whether connections to a number of connection target DRs corresponding to the number of connection target DRs, included in the counter, have been completed.

14. The apparatus of claim 13, wherein the transmission unit is configured to, if it is determined that the connections have not been completed even after the waiting time, transmit a Domain Participant (DP) discovery message required to discover a DP that is a container object for managing communication entities using a one-to-many communication method.

15. The apparatus of claim 12, wherein the transmission unit transmits the DR discovery message at each transmission time interval until the DR discovery message is transmitted to a last connection target DR in the list.

16. The apparatus of claim 12, wherein the discovery message communication unit is configured to, if the DR discovery message has been transmitted to a last connection target DR in the list, change a current state to a waiting state for receiving a DW discovery message from a DR that is not present in the list.

17. The apparatus of claim 16, wherein the discovery message communication unit is configured to, when the current state is changed to the waiting state, establish a communication connection to the DR by transmitting a DR discovery message to the DR after the DW discovery message has been received from the DR.

18. The apparatus of claim 14, wherein the transmission unit transmits the DP discovery message at each preset transmission time interval.

19. The apparatus of claim 11, wherein the reception unit is configured to, if information included in the DR discovery message is information corresponding to a topic and a service quality of a corresponding connection target DR, receive a DW discovery message from the connection target DR.

20. The apparatus of claim 11, wherein the discovery message communication unit is configured to, if the DR discovery message is transmitted as a response to the DW discovery message, change a current state to a waiting state for receiving a DW discovery message from a DR that is not present in the list.

* * * * *